(12) United States Patent
Di Stefano et al.

(10) Patent No.: US 11,377,077 B2
(45) Date of Patent: Jul. 5, 2022

(54) BRAKE-BY-WIRE AUTOMATIC BRAKE SYSTEM FOR VEHICLES

(71) Applicant: FRENI BREMBO S.P.A., Bergamo (IT)

(72) Inventors: Massimo Di Stefano, Curno (IT); Beniamin Szewczyk, Curno (IT); Michele Rota, Curno (IT); Samuele Mazzoleni, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 330 days.

(21) Appl. No.: 16/472,550

(22) PCT Filed: Dec. 22, 2017

(86) PCT No.: PCT/IB2017/058340
§ 371 (c)(1),
(2) Date: Jun. 21, 2019

(87) PCT Pub. No.: WO2018/116265
PCT Pub. Date: Jun. 28, 2018

(65) Prior Publication Data
US 2019/0322249 A1 Oct. 24, 2019

(30) Foreign Application Priority Data
Dec. 23, 2016 (IT) .................. 102016000130805

(51) Int. Cl.
*B60T 7/00* (2006.01)
*B60T 7/04* (2006.01)
(Continued)

(52) U.S. Cl.
CPC .............. *B60T 7/042* (2013.01); *B60T 7/12* (2013.01); *B60T 8/172* (2013.01); *B60T 8/48* (2013.01)

(58) Field of Classification Search
None
See application file for complete search history.

(56) References Cited

U.S. PATENT DOCUMENTS

| 4,653,815 | A | 3/1987 | Agarwal et al. |
| 5,887,954 | A | 3/1999 | Steiner et al. |
| 2013/0207452 | A1* | 8/2013 | Gilles ............ B60T 8/4018 303/9.75 |

FOREIGN PATENT DOCUMENTS

CN 103492247 A 1/2014
DE 102006014836 A1 10/2007
(Continued)

OTHER PUBLICATIONS

European Patent Office, International Search Report with Written Opinion issued in Application No. PCT/IB2017/058340, 14 pages, Rijswijk, Netherlands.
(Continued)

*Primary Examiner* — Truc M Do
(74) *Attorney, Agent, or Firm* — Marshall & Melhorn, LLC

(57) ABSTRACT

A brake system for vehicles may have at least one front automatic actuator device, operatively connected to a manual actuator device by means of a first control unit, and to at least one braking device of a first axle. The system may also include at least one rear automatic actuator device, operatively connected to the manual actuator device via a second control unit, and to the at least one braking device of a second axle.

14 Claims, 6 Drawing Sheets

(51) Int. Cl.
*B60T 7/12* (2006.01)
*B60T 8/172* (2006.01)
*B60T 8/48* (2006.01)

(56) References Cited

FOREIGN PATENT DOCUMENTS

| EP | 3009314 A1 | 4/2016 |
|---|---|---|
| WO | 2014048600 A1 | 4/2014 |
| WO | 2015032637 A1 | 3/2015 |

OTHER PUBLICATIONS

The China National Intellectual Property Administration—Office Action in Application No. CN2017800796658, dated Jan. 27, 2021, 19 pages.

* cited by examiner

BRAKE-BY-WIRE AUTOMATIC BRAKE SYSTEM FOR VEHICLES

FIELD OF APPLICATION

The present invention relates to a brake-by-wire automatic brake system for vehicles.

PRIOR ART

A "Brake by Wire" brake system is a system that, compared to traditional hydraulic brake systems, has a decoupling between the brake pedal and the actuators; the braking request of the driver exerted by means of a brake pedal is transduced into signals managed by a control unit capable of driving electro-hydraulic and/or electromechanical actuators.

One of the problems with this type of system is that of not being able to ensure normal operation in the presence of some faults, such as the loss of power supply which would compromise the service braking function.

DISCLOSURE OF THE INVENTION

Some solutions of the prior art envisage the use of valves which, in the event of an electrical fault, automatically restore the connection between the actuators and the manual actuation device, so that the driver can still exert the required braking action.

Therefore, under standard operating conditions, the user generates a pressure by acting on the manual control and a control system interprets this pressure request, transforming it into a corresponding pressure and braking action in the connected brake system. In this way, the user does not have direct control over the brake system, but there is always a control unit with corresponding actuators that translate the user's manual action into a corresponding request for braking action and, therefore, into hydraulic pressure and braking action, in the connected brake system.

The direct control of the system by the user is then restored only in the event of an electrical fault or malfunction of one or more components of the automatic activation system: in this case, in order to ensure the user's safety and to ensure the braking capacity of the system, the system immediately restores the direct connection between the manual actuation of the user and the braking devices.

The prior art systems, while ensuring the functionality and safety of the system in the event of a fault, are rather complex and expensive to be implemented.

The need to solve the drawbacks and limitations mentioned with reference to the prior art is therefore felt.

This requirement is met by a brake system according to claim 1.

In particular, this requirement is met by a brake system for vehicles comprising:
- a manual actuator device, operable by means of a lever and/or a pedal, selectively connectable to at least one braking device placed on a first axle of the vehicle, and at least one braking device placed on a second axle of the vehicle, each braking device acting on a relative brake disc or drum,
- at least one front automatic actuator device, operatively connected to said manual actuator device by means of a first control unit, and to the at least one braking device of the first axle of the vehicle,
- at least one rear automatic actuator device, operatively connected to the manual actuator device by means of a second control unit, and to the at least one braking device of the second axle of the vehicle, wherein said control units are programmed so as to actuate the respective automatic front and rear actuator devices as a function of the position or configuration of the manual actuator device, wherein at least the front automatic actuator device is of the electric-hydraulic type and is connected to a first hydraulic delivery circuit of the manual actuator device, by means of a first shut-off valve positionable in an operating position, in which it hydraulically disconnects the front automatic actuator device from the manual actuator device, and in a safety position in which it hydraulically connects the front electric-hydraulic automatic actuator device with the manual actuator device.

According to a possible embodiment, the first hydraulic delivery circuit is fluidically connected to a delivery volume of the front automatic actuator device, wherein the delivery volume comprises brake fluid that supplies the relative braking device.

According to a possible embodiment, the first shut-off valve is provided with a pair of non-return valves, in which a first non-return valve allows the discharge of any residual pressure left in the automatic hydraulic actuator devices, a second non-return valve has a filling function through connection with a brake fluid reservoir.

According to a possible embodiment, the rear automatic actuator device is of the electric-hydraulic type and is connected to the first hydraulic delivery circuit of the manual actuator device, by means of the first shut-off valve positionable in an operating position, in which it hydraulically disconnects the rear automatic actuator device from the manual actuator device, and in a safety position in which it hydraulically connects the rear automatic actuator device with the manual actuator device.

According to a possible embodiment, the first hydraulic delivery circuit is fluidically connected to a delivery volume of the rear automatic actuator device, the delivery volume comprising brake fluid that supplies the relative braking device.

According to a possible embodiment, the rear automatic actuator device is of the electric-hydraulic type and is connected to a second hydraulic delivery circuit of the manual actuator device, different from the first hydraulic delivery circuit by means of a second shut-off valve positionable in an operating position, in which it hydraulically disconnects the rear automatic actuator device from the manual actuator device, and in a safety position in which it hydraulically connects the rear automatic actuator device with the manual actuator device.

According to a possible embodiment, the first and the second hydraulic delivery circuit are fluidically connected to delivery volumes of each respective front and rear automatic actuator device, the delivery volumes comprising brake fluid that supplies corresponding braking devices.

According to an embodiment, the second shut-off valve is provided with a pair of non-return valves, in which a first non-return valve allows the discharge of any residual pressure left in the automatic hydraulic actuator devices, a second non-return valve has a filling function through connection with a brake fluid reservoir.

According to a possible embodiment, the front and rear automatic actuator devices are of the reversible type.

According to a possible embodiment, the manual actuator device, operable by means of a lever and/or a pedal, is connected to a passive pedal simulator, through a control valve which selectively connects or disconnects the manual actuator device from the passive pedal simulator.

According to a possible embodiment, the manual actuator device is provided with at least one stroke sensor, operatively connected to at least one control unit.

According to a possible embodiment, the manual actuator device is provided with at least one pressure sensor, operatively connected to at least one control unit.

According to a possible embodiment, each control unit is programmed so that when the manual actuator device is actuated it controls the actuation of one or more corresponding automatic actuator devices so as to achieve, alternatively or jointly for each braking device, the steps of:
- generating a braking action or increasing the braking action of each braking device of the system, in order to perform stability control of the vehicle,
- controlling the braking action of the braking system so as not to further operate the braking devices regardless of the actual braking request of the user,
- reducing or cancelling the braking action on each braking device, in case of incipient jamming phenomena or vehicle instability.

According to a possible embodiment, the brake system comprises:
- two braking devices on the first axle, each connected to a respective front automatic actuator device, operatively connected to said manual actuator device, by means of a first control unit,
- two braking devices on the second axle, each connected to a respective rear automatic actuator device, operatively connected to said manual actuator device, by means of a second control unit.

According to a possible embodiment, the manual actuator device is a hydraulic pump, provided with at least a brake fluid reservoir provided with a fluid level sensor inside it, so as to estimate the wear of the pads of the braking devices.

DESCRIPTION OF THE DRAWINGS

Further features and advantages of the present invention will appear more clearly from the following description of preferred non-limiting embodiments thereof, in which.

Elements or parts of elements in common to the embodiments described below are referred to with the same reference numerals.

DETAILED DESCRIPTION

Figure 1:
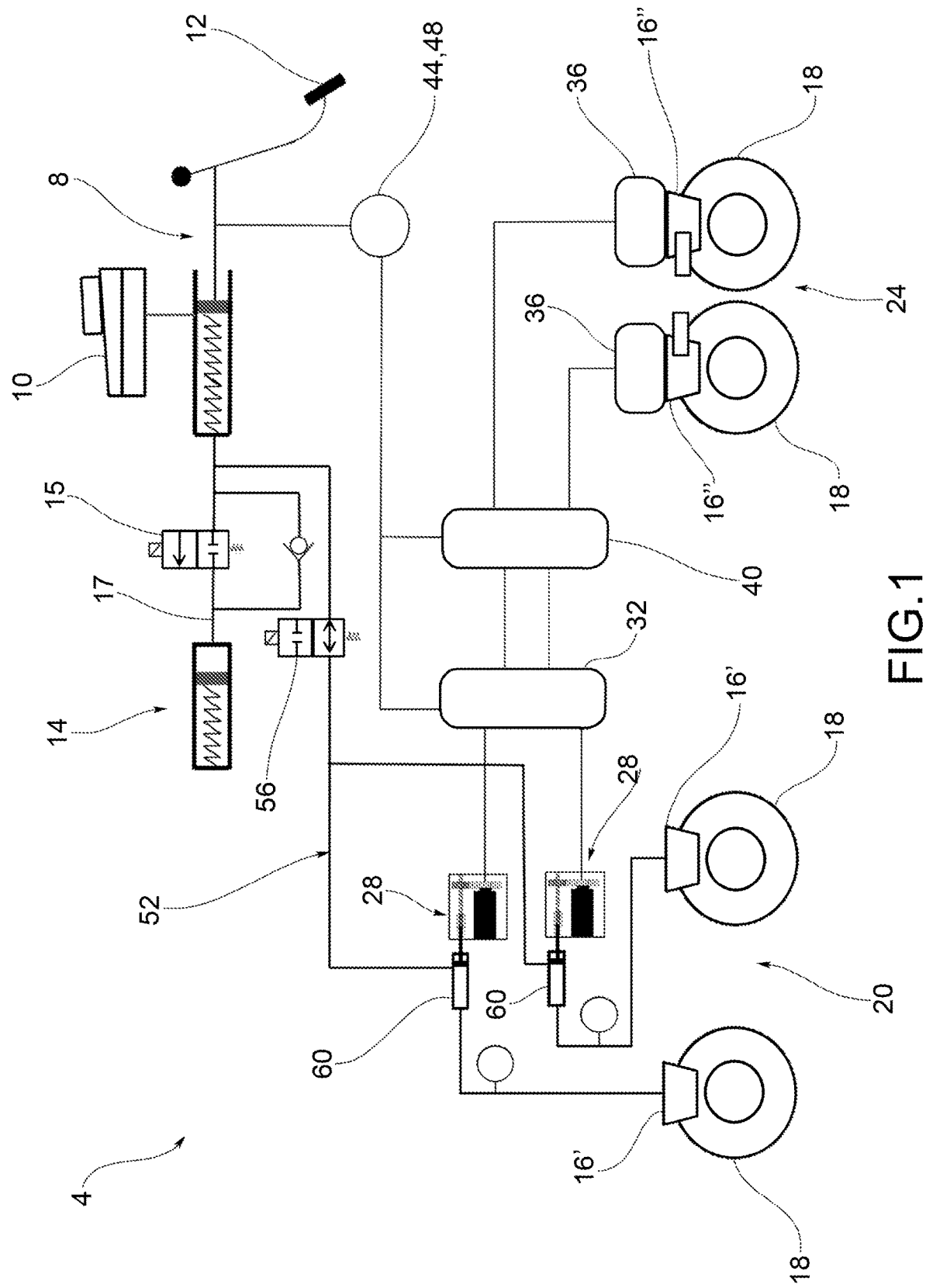
FIGS. 1-6 shows schematic views of brake systems according to possible variants of embodiments of the present invention.

With reference to the above figures, reference numeral 4 globally denotes a brake system for vehicles.

The definition of vehicle must be understood in a non-limiting manner, preferably referring to, but not limited to, motor vehicles and/or vehicles.

The brake system 4 comprises a manual actuator device 8, which can be operated by means of a lever and/or a pedal 12, selectively connectable to at least one braking device 16.

The braking device 16 is, for example, a disk brake caliper acting on an associable brake disc or is, for example, a drum brake comprising one or more jaws acting on an associable drum, in a known manner.

For example, the manual actuator device 8 is a hydraulic pump, of a known type, provided with at least one brake fluid reservoir 10.

According to an embodiment, the brake fluid reservoir 10 is provided with a fluid level sensor therein, so as to estimate the wear of the pads of the braking devices 16.

According to an embodiment, the manual actuator device 8, operable by means of the lever and/or a pedal 12, is connected to a passive pedal simulator 14 (of known type), through a control valve 15 that selectively connects or disconnects the manual actuator device 8 to 7 from the passive pedal simulator 14, through a control circuit 17, as better described hereinafter.

The vehicle comprises at least a first axle 20 provided with at least one braking device 16' and at least one second axle 24 provided with at least one braking device 16". Each braking device 16 acts on a relative brake disc or drum 18, so as to exert a braking action, when activated.

As mentioned above, the definition of vehicle must be understood in a broad sense: for this reason, the concept of axle must be understood in a generic manner, not necessarily implying a vehicle but also comprising a motorcycle with two or more wheels.

The system comprises at least one front automatic actuator device 28, operatively connected to said manual actuator device 8 by means of a first control unit 32, and to the at least one braking device 16' of the first axle 20 of the vehicle.

Moreover, system 4 at least one rear automatic actuator device 36, operatively connected to the manual actuator device 8 by means of a second control unit 40, and to the at least one braking device 16" of the second axle 24 of the vehicle.

Advantageously, said first and second control unit 32, 40 are programmed so as to actuate the respective automatic front and rear actuator devices 28, 36 as a function of the position or configuration of the manual actuator device 8. In other words, the position or configuration of the manual actuator device 8 indicates a braking request by the user which is received by the control units 321, 40 and switched into a signal for actuating the automatic front and rear actuator devices 28, 36.

According to a possible embodiment of the present invention, the manual actuator device 8 is provided with at least one stroke sensor 44, operatively connected to at least one control unit 32, 40. The stroke sensor detects the actuating stroke of the user-operated pedal or lever; this stroke is transformed into a request for braking action.

According to a possible further embodiment of the present invention, the manual actuator device 8 is provided with at least one pressure sensor 48, operatively connected to at least one control unit 32, 40. The pressure sensor 48 senses the pressure exerted manually by the user on the lever or pedal 12 in order to directly measure the user's request for braking action in the form of pressure generated.

The stroke and pressure sensors 44, 48 serve to convert the manual actuation of the manual actuator device 8 by a user in a braking request with which to activate the braking devices 16 by means of the front 28 and/or rear 36 automatic actuator devices.

Advantageously, at least the front automatic actuator device 28 is of the electro-hydraulic type and is connected to a first hydraulic delivery circuit 52 of the manual actuator device 8, by means of a first shut-off valve 56.

The shut-off valve 56 is positionable in an operating position, in which it hydraulically disconnects the front automatic actuator device 28 from the manual actuator device 8, and in a safety position in which it hydraulically connects the front electric-hydraulic automatic actuator device 28 with the manual actuator device 8.

The operating position represents the standard working condition of the brake system 4, while the safety position represents the position in which the shut-off valve 56 is arranged in the event of a malfunction or electrical fault in the system.

In other words, the system normally operates by hydraulically disconnecting the front automatic actuator device 28 from the manual actuator device 8 so as to have a by-wire operation in which the user does not directly control the actuation of the braking devices 16; the direct hydraulic connection between the user, by action on the manual actuator device 8, and the braking devices 16 only occurs in the event of malfunctions of system 4.

In particular, the first hydraulic delivery circuit is fluidically connected to a delivery volume 60 of the front automatic actuator device 28, wherein the delivery volume 60 comprises brake fluid that supplies the relative braking device 16 in a known manner.

According to a possible embodiment (FIGS. 2-3), the rear automatic actuator device 36 is of the electro-hydraulic type and is connected to the first hydraulic delivery circuit 52 of the manual actuator device 8, by means of the first shut-off valve 56 positionable in an operating position.

Figure 2:
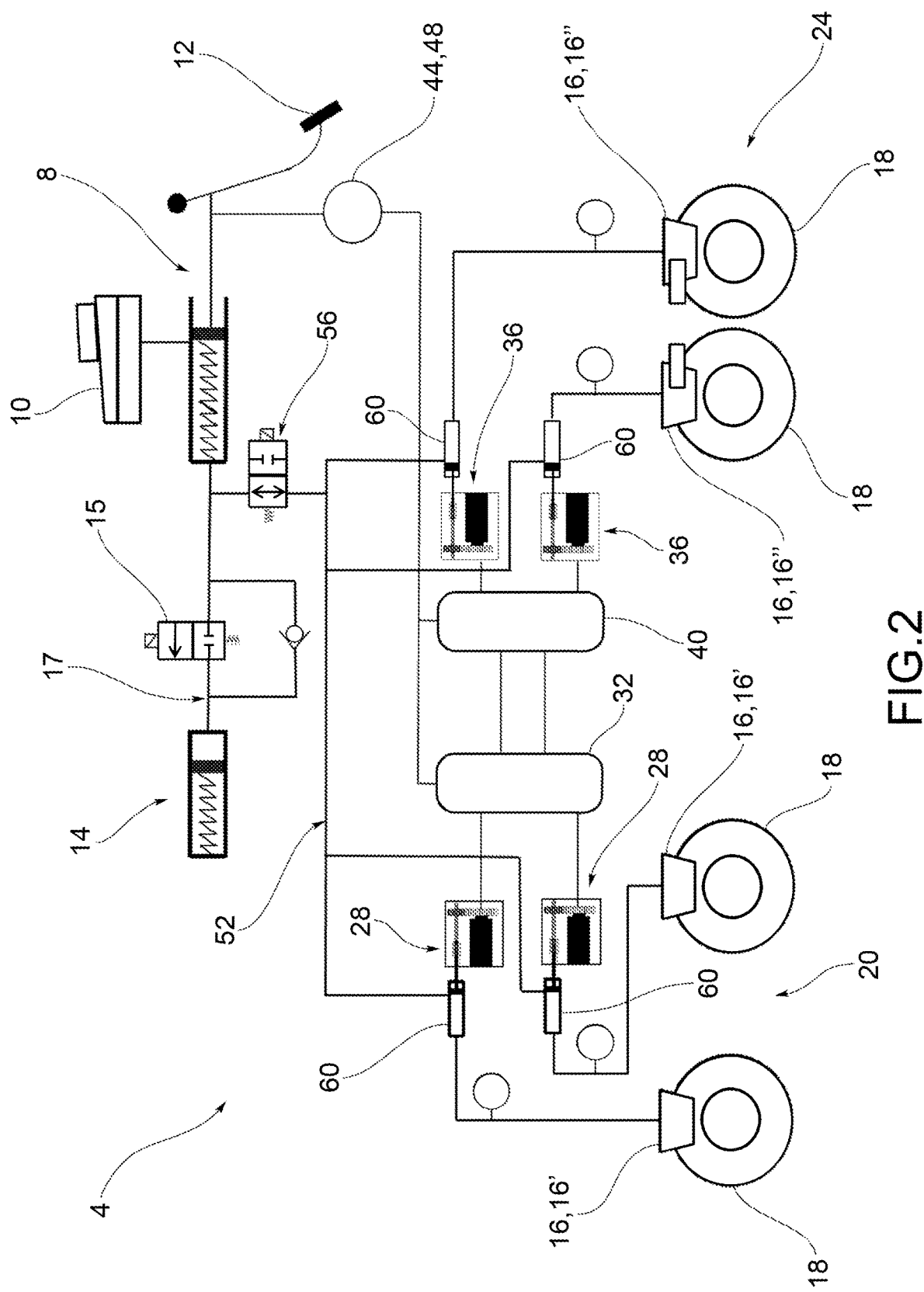
Figure 3:
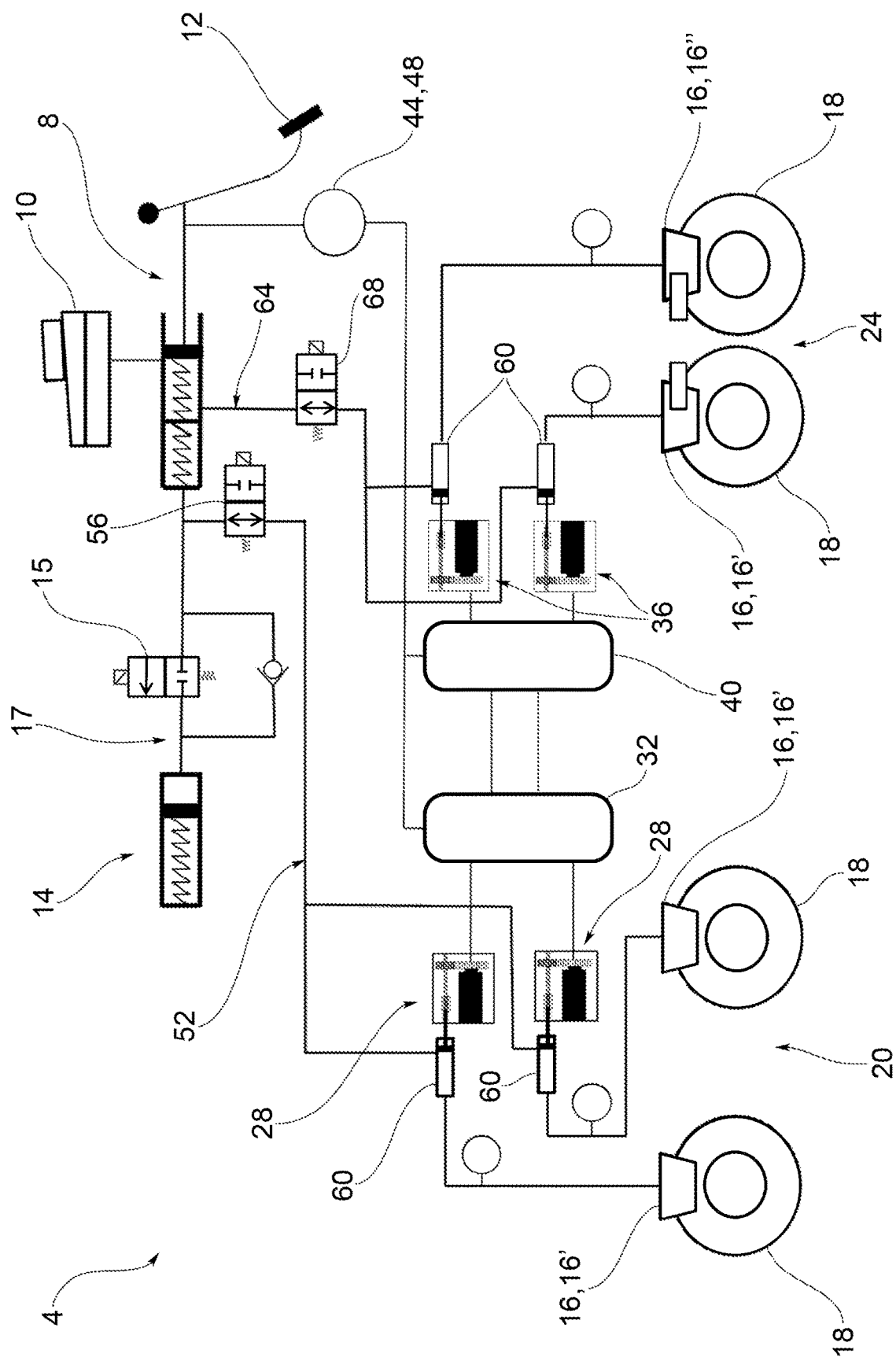

The first shut-off valve 56 in the operating position hydraulically disconnects the rear automatic actuator device 36 from the manual actuator device 8, and in the safety position it hydraulically connects the rear automatic actuator device 36 with the manual actuator device 8 (FIG. 2).

The first hydraulic delivery circuit 52 is fluidically connected to a delivery volume 60 of the rear automatic actuator device 36, wherein the delivery volume comprises brake fluid that supplies the relative braking device 16.

Figure 4:
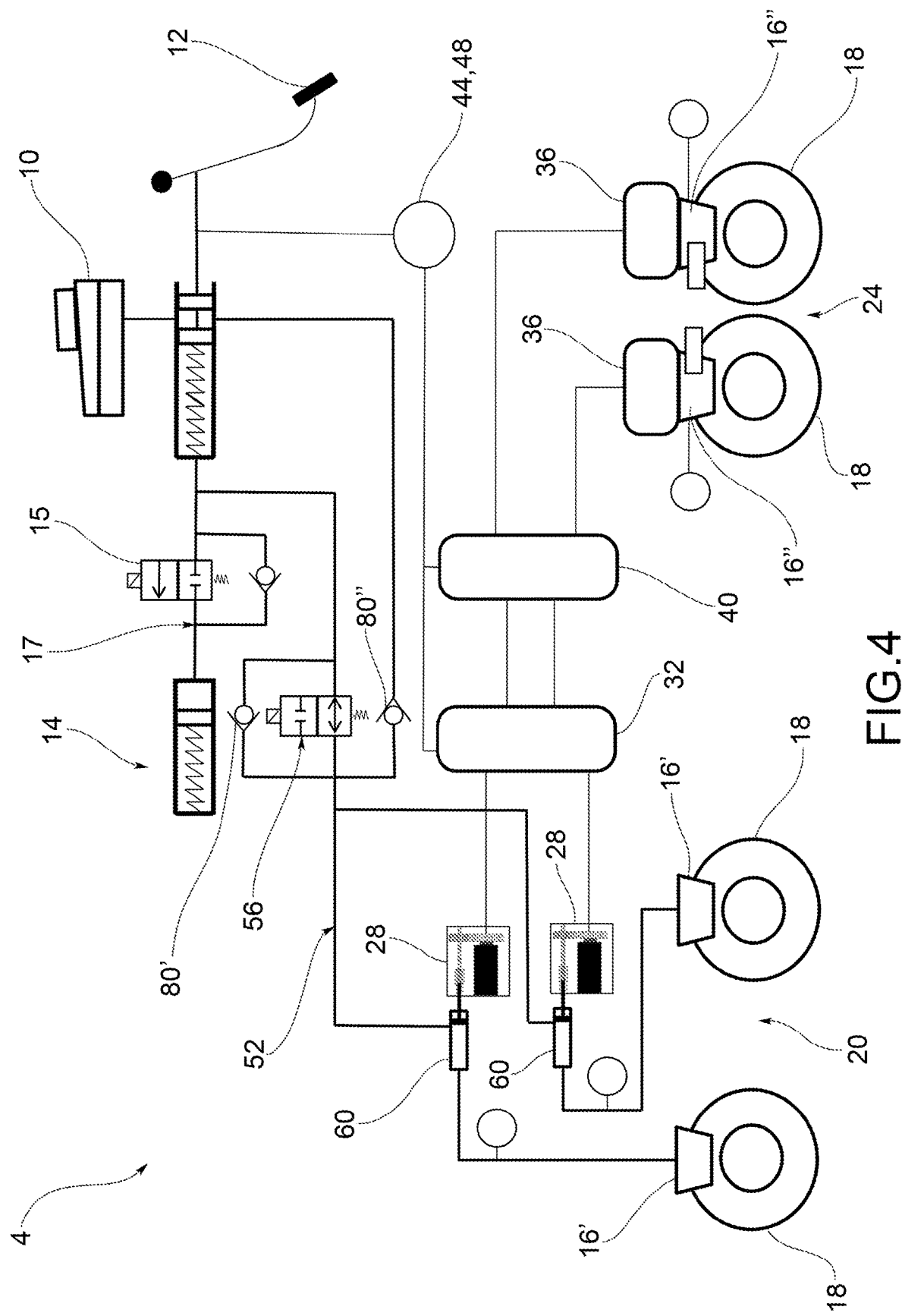
Figure 5:
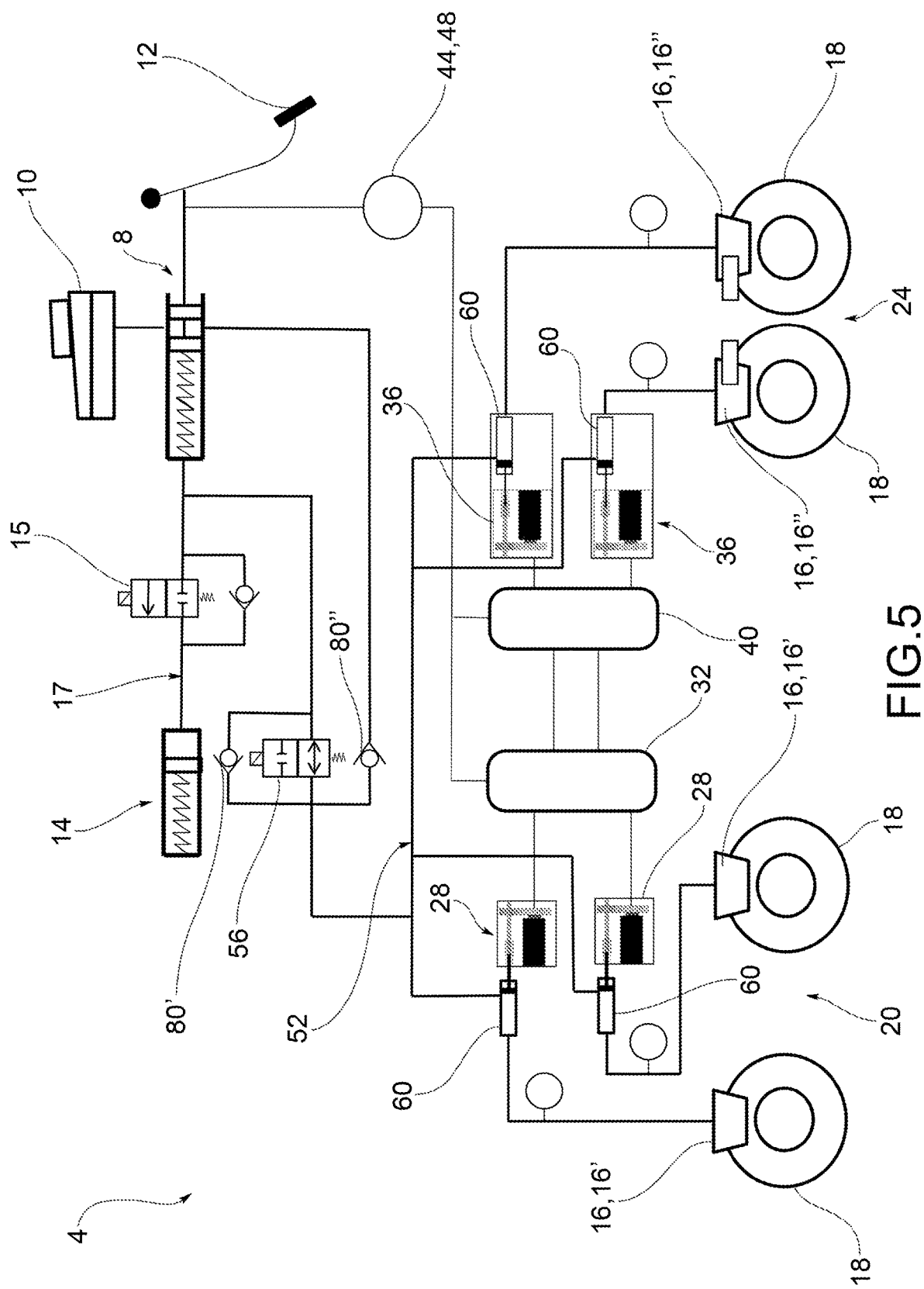
Figure 6:
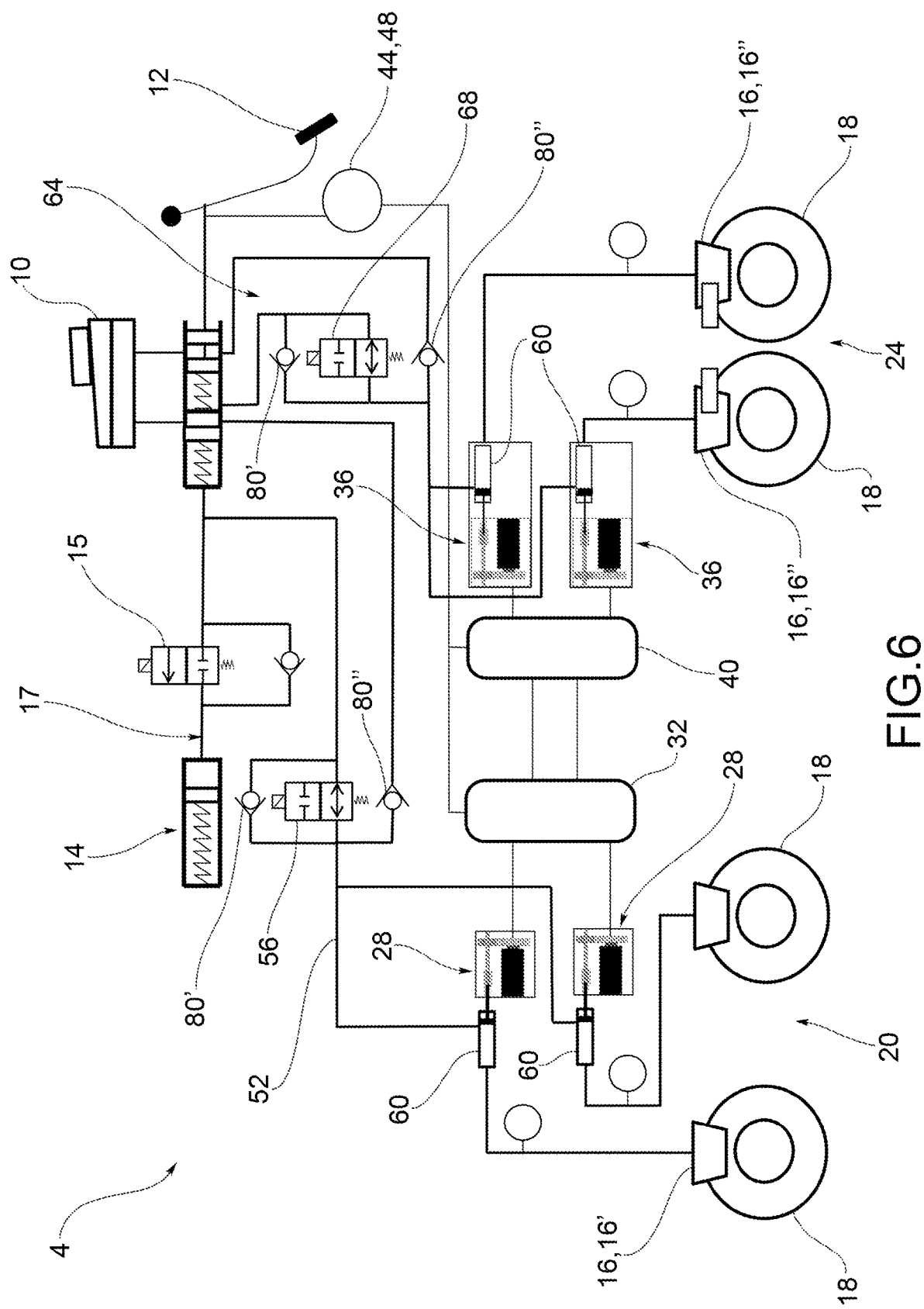

According to a possible embodiment (FIGS. 4-6), the first shut-off valve 56 is provided with a pair of non-return valves 80', 80", in which a first non-return valve 80' allows the discharge of any residual pressure left in the automatic hydraulic actuator devices, for example in the case of thermal expansion of the brake fluid. A second non-return valve 80" instead has the function of filling by means of the connection with the brake fluid reservoir 10, i.e. it allows the refilling of brake fluid in the system in the event that there is a need for brake fluid compensation.

According to a further possible embodiment of the present invention (FIG. 3), the rear automatic actuator device 36 is of the electro-hydraulic type and is connected to a second hydraulic delivery circuit 64 of the manual actuator device 8, distinct from the first hydraulic delivery circuit 52, by means of a second shut-off valve 68.

Said second shut-off valve 68 is positionable in an operating position, in which it hydraulically disconnects the rear automatic actuator device 36 from the manual actuator device 8, and in a safety position in which it hydraulically connects the rear automatic actuator device 36 with the manual actuator device 8.

In other words, system 4 normally operates by hydraulically disconnecting the rear automatic actuator device 36 from the manual actuator device 8 so as to have a by-wire operation in which the user does not directly control the actuation of the braking devices 16; the direct hydraulic connection between the user, by action on the manual actuator device 8, and the braking devices 16 only occurs in the event of malfunctions of system 4.

According to a possible embodiment (FIG. 6), the second shut-off valve 68 is provided with a pair of non-return valves 80', 80", in which a first non-return valve 80' allows the discharge of any residual pressure left in the automatic hydraulic actuator devices, for example in the case of thermal expansion of the brake fluid. A second non-return valve 80" instead has the function of filling by means of the connection with the brake fluid reservoir 10, i.e. it allows the refilling of brake fluid in the system in the event that there is a need for brake fluid compensation.

The first and the second hydraulic delivery circuit 52, 64 are fluidically connected to delivery volumes of each respective front and rear automatic actuator device 28, 36.

The delivery volumes 60, as seen, comprise brake fluid which supplies corresponding braking devices 16.

Preferably, the first and the second shut-off valves 56, 68 are independent of each other so as to be able to connect and disconnect the front and rear automatic actuator devices 28, 36 from the manual actuator device 8 independently. In this way, it is possible to intervene by correcting partial electrical malfunctions of the brake system 4.

With regard to safety, preferably said front and rear automatic actuator devices 28, 36 are of the reversible type.

In this way, in the event of an electrical fault, upon termination of the torque by the electric motor of the electro-hydraulic actuator devices, on the one hand the electro-hydraulic actuator devices interrupt any braking action on the braking devices 16, due to their irreversibility, on the other hand the system is in a safety position allowing the hydraulic actuation of the braking devices 16 through the action of the user on the manual actuator device 8.

Therefore, reversibility prevents the undesired locking of the braking devices 16 in the braking condition.

The control units 32, 40 are programmed so that, when the manual actuator device 8 is actuated, they control the actuation of one or more corresponding front and rear automatic actuator devices 28, 36 so as to carry out, alternatively or jointly, for each braking device 16, the steps of:

generating braking action or increasing the braking action on each braking device 16 of the system 4, in order to carry out a stability check on the vehicle, checking the braking action of the brake system 4 so as not to further actuate the braking devices 16 irrespective of the actual request for braking action by the user (for example, to prevent blocking the wheels)

reducing or cancelling the braking action on each braking device 16, in the event of the occurrence of blocking or instability phenomena of the vehicle.

In other words, the system 4 of the present invention allows acting on the braking devices 16 of the single wheels to correct a braking action requested by the user (typically in the case of locking of one or more wheels) and/or dynamically stabilising the vehicle (for example, in case of loss of control of the same).

In particular, in order to "increase" the overall braking action, it is meant that the brake system 4, under the supervision of the control unit 32, 40, by acting on the front and/or rear automatic actuators 28, 36, is able to increase the braking action of the braking devices 16, with respect to the braking action requested manually by the user by actuating the lever or pedal 12.

By "controlling" the braking action of the brake system 4, it is meant that the control unit 32, 40, acting on the front and/or rear automatic actuator devices 28, 36, is able to limit the overall braking action of the system, so as not to further actuate one or more braking devices 16 of the system 4, although the user requires greater braking capacity to the system 4, by acting on the lever or pedal 12 of the manual actuator device 8.

By "reducing" the total braking action imposed by the manual actuator device 8, it is meant that the control unit 32, 40, acting on the front and/or rear automatic actuators 28, 36, is able to decrease the braking action by acting on the braking devices 16 so as to reduce the braking capacity thereof, also against the braking request imposed by the user by means of the lever or pedal 12 of the manual actuator device 8.

These actions may be of the "passive" type, i.e. resulting from a request for braking action by the user by means of the manual actuator device 8 (typically the anti-locking function of one or more wheels), or they may be of the "active" type, i.e. resulting from the detection of a condition of dynamic instability of the vehicle, in the absence of a request for braking action by the user (typically, the dynamic control of the vehicle stability).

Finally, as seen, the present invention applies to any type of vehicle, with two or more wheels.

For example, the vehicle may comprise:
- two braking devices 16' on the first axle 20, each connected to a respective front automatic actuator device 28, operatively connected to said manual actuator device 8, by means of a first control unit 32,
- two braking devices 16" on the second axle 24, each connected to a respective rear automatic actuator device 36, operatively connected to said manual actuator device 8, by means of a second control unit 40.

The operation of a brake system according to the present invention shall now be described.

In particular, in the event of a request for braking action, the user acts on the lever or pedal 12 of the manual actuator device 8; this request is detected by the stroke 44 and/or pressure 48 sensors.

In the case of standard operation, the user's request is conveyed, through the control valve 15, to the passive pedal simulator 14 which provides the user with a mechanical resistance feedback. In this way, the control valve 15 prevents the fluid connection between the control circuit 17 and the automatic actuator devices. In fact, the pressure exerted by the user is not conveyed in the first or second hydraulic supply circuit 52, 64.

In fact, together with the operation of the control valve 15 which connects the manual actuator device 8 to the passive pedal simulator 14, the first and/or the second shut-off valve 56, 68 fluidically disconnect the manual actuator device 8 from the corresponding first and second hydraulic delivery circuits 52, 64.

At the same time, the control units 32, 40 receive the signal corresponding to the request for braking by the user, process it according to the dynamic parameters of the vehicle and send it to the front and rear automatic actuators 28, 36 to operate the corresponding braking devices 16.

The sequence described above also occurs in the case of active control of the vehicle stability: in this case, however, the control units 32, 40 directly operate the front and rear automatic actuators 28, 36 so that they activate the corresponding braking devices 16 to stabilise the vehicle.

In the event of an electrical fault, the control valve 15 disconnects the manual actuator device 8 from the passive pedal simulator 14. Moreover, the first and second shut-off valve 56, 68 fluidically connect the manual actuator device 8 to the respective first and second hydraulic delivery circuit 52, 64, so as to directly supply the delivery volumes 60 of the front and rear automatic actuator devices. 28, 36 of electro-hydraulic type. In this way, the pressurised fluid can directly supply each respective braking device 16.

As can be appreciated from the foregoing, the brake system according to the invention overcomes the drawbacks of the prior art.

In particular, the present invention allows a reduction in the costs and the architectural complexity of a traditional brake-by-wire system, as it allows avoiding a second source of redundant energy by making use of the driver's muscular energy for the emergency braking according to the legal regulations.

Advantageously, in the present invention the hydraulic backup connection is provided between the manual actuator device and the electro-hydraulic actuators, passing through the volume containing brake fluid.

This architecture saves a control valve compared to known brake-by-wire solutions; moreover, it is sufficient that the valve used is sized to withstand much lower pressures than known solutions.

The pair of non-return valves is particularly advantageous in all those cases in which, inside the hydraulic calipers, there is an undesired residual pressure (for example in the case of thermal expansion of the brake fluid) which would result in a residual braking torque. In particular, the first shut-off valve overcomes this drawback, since it allows always discharging said residual pressure when the normally open valve 56 is closed (i.e. in normal operating condition), connecting the hydraulic circuit directly to the automatic actuator device.

Furthermore, the brake fluid recovery function is implemented by connecting at least one braking device by means of a connection to a brake fluid reservoir.

Moreover, when, for example, temperature returns to nominal conditions, the opposite problem can occur, namely the lack of fluid previously discharged which involves a depression and for example a retraction of the pistons of the hydraulic calipers, whereby there is a risk of longer response times. To avoid this possibility, therefore, this brake fluid must be compensated: this recovery/compensation can take place due to the second non-return valve which directly connects the hydraulic circuit to the brake fluid reservoir.

In this way, it is also possible to compensate for the wear generated by the use of the pads of the braking devices.

The system of the present invention allows simplifying and reducing the total number of components with respect to known brake-by-wire systems.

At the same time, each braking device is actuated by a corresponding independent automatic actuator device: in this way, both active and passive braking of each individual vehicle wheel can be controlled quickly and reliably.

Moreover, in this way it is possible, as seen, to adopt strategies to control the vehicle stability which are both passive, in the event of a braking request by the user, and active, in the event of identification of a condition of dynamic instability of the vehicle and relative correction by automatic and selective braking of individual vehicle wheels.

A man skilled in the art, in order to meet contingent and specific requirements, may make several modifications and variants to the brake systems described above, all of which fall within the scope of the invention as defined by the following claims.

The invention claimed is:
1. A braking system for vehicles, comprising:
a manual actuator device, operable via a lever and/or a pedal, selectively connectable to at least one braking device placed on a first axle of the vehicle, and at least one braking device placed on a second axle of the vehicle, each braking device acting on a respective brake disc or drum, at least one front automatic actuator device, operatively connected to said manual actuator device via a first control unit, and to the at least one braking device of the first axle of the vehicle, at least one rear automatic actuator device, operatively connected to the manual actuator device via a second control unit, and to the at least one braking device of the second axle of the vehicle, wherein said control units are programmed so as to actuate the respective automatic front and rear actuator devices as a function of the position or configuration of the manual actuator device, wherein at least the front automatic actuator device is of an electric-hydraulic type and is connected to a first hydraulic delivery circuit of the manual actuator device, via a first shut-off valve positionable in an operating position, in which it hydraulically disconnects the front automatic actuator device from the manual actuator device, and in a safety position in which it hydraulically connects the front electric-hydraulic automatic actuator device with the manual actuator device;

in which the first shut-off valve is provided with a pair of non-return valves, in which a first non-return valve allows the discharge of any residual pressure left in the automatic hydraulic actuator devices, a second non-return valve has a filling function through connection with a brake fluid reservoir.

2. The braking system for vehicles according to claim 1, wherein the first hydraulic delivery circuit is fluidically connected to a delivery volume of the front automatic actuator device, the delivery volume comprising brake fluid that supplies the respective braking device.

3. The braking system for vehicles according to claim 1, wherein the rear automatic actuator device is of the electric-hydraulic type and is connected to the first hydraulic delivery circuit of the manual actuator device, via the first shut-off valve positionable in an operating position, in which it hydraulically disconnects the rear automatic actuator device from the manual actuator device, and in a safety position in which it hydraulically connects the rear electric-hydraulic automatic actuator device with the manual actuator device.

4. The braking system for vehicles according to claim 1, wherein the first hydraulic delivery circuit is fluidically connected to a delivery volume of the rear automatic actuator device, the delivery volume comprising brake fluid that supplies the respective braking device.

5. The braking system for vehicles according to claim 1, wherein the rear automatic actuator device is of the electric-hydraulic type and is connected to a second hydraulic delivery circuit of the manual actuator device, separate from the first hydraulic delivery circuit via a second shut-off valve positionable in an operating position, in which it hydraulically disconnects the rear automatic actuator device from the manual actuator device, and in a safety position in which it hydraulically connects the rear electric-hydraulic automatic actuator device with the manual actuator device.

6. The braking system for vehicles according to claim 5, wherein the first and second hydraulic delivery circuits are fluidically connected to delivery volumes of each of the respective front and rear automatic actuator devices, the delivery volumes comprising brake fluids that supply the respective braking devices.

7. The braking system for vehicles according to claim 5, in which the second shut-off valve is provided with a pair of non-return valves, in which a first non-return valve allows the discharge of any residual pressure left in the automatic hydraulic actuator devices and a second non-return valve has a filling function through connection with a brake fluid reservoir.

8. The braking system for vehicles according to claim 1, wherein said front and rear automatic actuator devices are of a reversible type.

9. The braking system for vehicles according to claim 1, in which the manual actuator device, operable via a lever and/or a pedal, is connected to a passive pedal simulator, through a control valve which selectively connects or disconnects the manual actuator device from the passive pedal simulator.

10. The braking system for vehicles according to claim 1, in which the manual actuator device is provided with at least a stroke sensor, operatively connected to at least one of the control units.

11. The braking system for vehicles according to claim 1, in which the manual actuator device is provided with at least a pressure sensor, operatively connected to at least one of the control units.

12. The braking system for vehicles according to claim 1, wherein each control unit is programmed so that when the manual actuator device is actuated it controls the actuation of one or more corresponding automatic actuator devices so as to achieve, alternatively or jointly for each braking device, the steps of:
generating a braking action or increasing the braking action of each braking device of the system, in order to perform stability control of the vehicle,
controlling the braking action of the braking system so as not to further operate the braking devices regardless of the actual braking request of the user,
reducing or cancelling the braking action on each braking device, in case of incipient jamming phenomena or vehicle instability.

13. The braking system for vehicles according to claim 1, comprising:
two braking devices on the first axle, each connected to a respective front automatic actuator device, operatively connected to said manual actuator device, via a first control unit,
two braking devices on the second axle, each connected to a respective rear automatic actuator device, operatively connected to said manual actuator device via a second control unit.

14. The braking system for vehicles according to claim 1, in which the manual actuator device is a hydraulic pump, provided with at least a brake fluid reservoir provided with a fluid level sensor inside it, so as to estimate the wear of the pads of the braking devices.

* * * * *